June 9, 1925.

D. G. GREGORIE

LAWN MOWER

Filed Feb. 14, 1920

1,540,834

Inventor:
David George Gregorie
By Lawrence Laugner
Attorney

Patented June 9, 1925.

1,540,834

UNITED STATES PATENT OFFICE.

DAVID GEORGE GREGORIE, OF PAHIATUA, NEW ZEALAND.

LAWN MOWER.

Application filed February 14, 1920. Serial No. 358,607.

*To all whom it may concern:*

Be it known that I, DAVID GEORGE GREGORIE, subject of the King of Great Britain, residing at the Gorge, Pahiatua, in the Dominion of New Zealand, have invented a new and useful Improvement in Lawn Mowers; and I do hereby declare the following to be a full, clear, and exact description of the same.

This invention has reference to the ordinary type of lawn mower in which a stationary cutter bar works in combination with a rotating cutter having helically twisted blades extending along its length and engaging with the surface of the knife blade on the stationary cutter.

Hitherto considerable difficulty has been experienced in obtaining a correct adjustment of the stationary cutter in relation to the revolving cutter and also in obtaining a proper compensation for the variable wear upon the knives of the rotating cutter and also for the wear on the stationary cutter knife.

The present invention has therefore been devised with the object of providing for the automatic adjustment of the stationary cutter in relation to the rotating cutter so that as either, or both, wear, the wear will be compensated for and the stationary cutter kept in its proper alignment and adjustment for effective working combination with the rotating cutter.

The invention consists broadly in so mounting the cutter carrying bar of the machine that the cutting edge of the knife thereon may turn in or out in relation to the line of rotation of the rotating cutter, and in spring controlling the said bar in such a manner that the said edge will be turned normally into contact with the blades of the rotating cutter with a yielding spring pressure thereon, that will keep the two in proper cutting relation.

The said construction is illustrated in the accompanying drawings, in which:—

In carrying out the invention the stationary cutter is formed by the metal carrier frame or bar A extending across between the side cheeks B of the machine, and having the knife blade C secured to its forward edge. This cutter occupies the usual position in the machine relative to the rotating cutter. The bar or frame A is made at each end with a flange A' that fits against the inside of the corresponding side cheek B and is attached thereto by a screw pin, or the like D, passing through it and into such cheek. The two pins D are arranged opposite one another in a line parallel with the axle of the rotating cutter, and form pivots upon which the frame or bar A may turn up or down so as to move the cutting edge of the blade C in or out in relation to the line of rotation of such rotating cutter. When it is turned in, the said blade assumes the proper relationship to the rotating cutter to perform the usual mowing operation.

This carrier frame or bar A is spring controlled at each end so as to keep the knife C in springy engagement with the rotating cutter, by means of a lever E pivoted at one of its ends to the inside of the mower cheek B on the corresponding side and then extending rearwardly and engaging at its other end beneath a snug or tooth F projecting forwardly from the carrier lug A'. The said lever is suspended from a lug G on the cheek by means of a bolt H passing up through it and through such lug and forced normally upward by means of a cushion spring J in compression between the lug and a nut H' on the end of the bolt. The spring may therefore be adjusted in its tension by screwing the nut up or down on the bolt. The said springs will therefore draw the two levers E upward and thereby tipping the carrier frame A at the top back on its pins D and lifting the knife blade C forward and upward against the rotating cutter in the desired manner.

Consequently this adjustment and spring hinging of the carrier frame A will ensure of any wear on the cutters being automatically compensated for, the fixed cutter being at all times kept in proper cutting contact with the rotating cutter.

Figure 1:
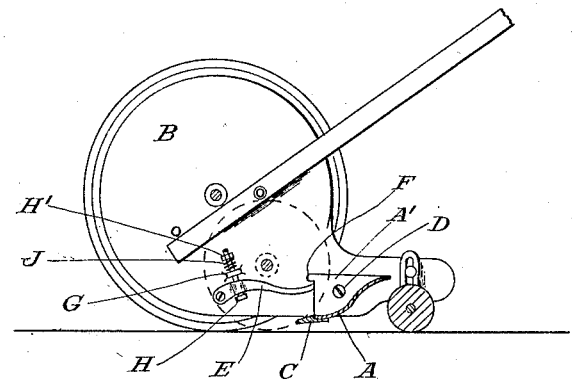
Figure 1 is a sectional side elevation of a mower with the rotating knives omitted but their position indicated by dotted lines.
Figure 2:
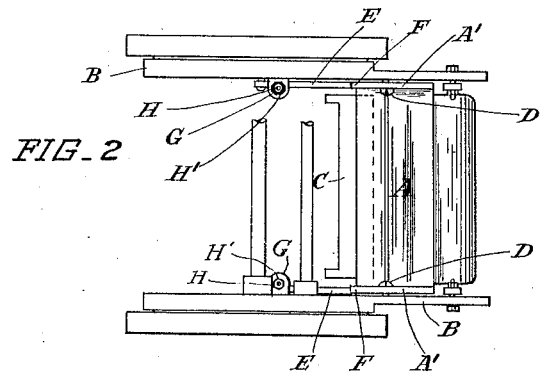
Figure 2 is a plan of the same.
Figure 3:
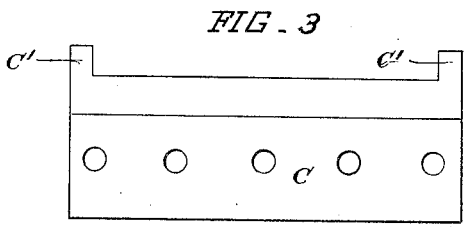
Figures 3 and 4 are respectively plan and sectional elevation of a knife as designed for use with this invention.
Figure 4:
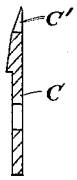

At each end of the knife blade C, it is preferably provided with a projection C' (Figures 3 and 4) extending forwardly from the cutting edge and having a curved upper face curving downward away from contact with the rotating cutter. These projections serve to engage each knife of the rotating cutter as it comes round in the rotation of the cutter and to act as guides by which the knife is directed across the edge of the blade C, thereby preventing any possibility of the knife knocking such edge, as it comes round to engage it. The usual helical twist of the rotating cutter knives also assists in this guiding action.

It will be readily understood that equivalent means for spring controlling the carrier frame A so as to turn the knife blade C in, may be devised without departing from the general features of the means shown and described herein. It is not therefore desired to confine the invention exclusively to the use of such means.

I claim:—

1. In lawn mowers having a rotating cutter, and a stationary cutter, a carrier frame for the stationary cutter, side cheeks on the respective sides of the frame, a knife blade secured along the forward edge of said carrier frame and arranged to extend across between the side cheeks, a flange on each end of the carrier frame directly engaging the inside of the corresponding side cheek, a pivot pin passing through the flange and into the said side cheek, and lever arms, each pivoted forwardly of the carrier and at one end to the side of one cheek of the machine and at its other end engaging with the forward edge of the said carrier frame on its respective side, and a spring acting upon said lever and normally turning it up upon its pivot, substantially as and for the purposes specified.

2. In lawn mowers having a rotating cutter, and a stationary cutter, a carrier frame for the stationary cutter, side cheeks on the respective sides of the frame, a knife blade secured along the forward edge of said carrier frame and arranged to extend across between the side cheeks, a flange on each end of the carrier frame directly engaging the inside of the corresponding side cheek, a pivot pin passing through the flange, and into the said side cheek, and lever arms, each pivoted forwardly of the carrier and at one end to the side of one cheek of the machine and at its other end engaging directly with the forward edge of the said carrier frame on its respective side, and a spring acting upon said lever and normally turning it up upon its pivot, substantially as and for the purposes specified.

In testimony whereof I have signed this specification in the presence of two subscribing witnesses.

DAVID GEORGE GREGORIE.

Witnesses:
A. M. KENNEDY,
F. LOGAN.